(12) United States Patent
Smith

(10) Patent No.: US 6,378,408 B2
(45) Date of Patent: *Apr. 30, 2002

(54) APPARATUS FOR VARIABLY CONTROLLING WORK FEED RATE FOR CUTTING WOOD, METAL AND OTHER MATERIALS

(75) Inventor: H. Reid Smith, Kooskia, ID (US)

(73) Assignee: Simonds Industries, Inc., Fitchburg, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/545,967

(22) Filed: Apr. 10, 2000

Related U.S. Application Data

(62) Division of application No. 08/966,456, filed on Nov. 7, 1997.

(51) Int. Cl.$^7$ ............................................... B23D 53/00
(52) U.S. Cl. .................. 83/75; 83/74; 83/76; 700/193
(58) Field of Search ................................ 83/13, 56, 72, 83/74, 76, 76.8, 76.9, 76.1, 76.6, 76.7, 789, 794, 801, 75, 62.1, 800; 364/474.3, 474.34; 700/176, 193

(56) References Cited

U.S. PATENT DOCUMENTS

| | | | | |
|---|---|---|---|---|
| 3,680,417 A | * | 8/1972 | Wells |
| 3,992,614 A | * | 11/1976 | Buss |
| 4,133,235 A | * | 1/1979 | Gerber |
| 4,357,848 A | * | 11/1982 | Sakurai et al. |
| 4,432,260 A | * | 2/1984 | Sarurai et al. |
| 4,437,367 A | * | 3/1984 | Hauser |
| 4,481,845 A | * | 11/1984 | Sakurai et al. |
| 4,484,413 A | * | 11/1984 | Yamamoto et al. |
| 4,625,603 A | * | 12/1986 | Vanden Brink |
| 4,644,832 A | * | 2/1987 | Smith |
| 4,765,213 A | * | 8/1988 | Kondo |
| 5,287,843 A | * | 2/1994 | Katayama |
| 5,513,113 A | * | 4/1996 | Okada et al. |
| 5,694,821 A | * | 12/1997 | Smith |

\* cited by examiner

*Primary Examiner*—Kenneth E. Peterson
(74) *Attorney, Agent, or Firm*—Frank J. Dykas; Robert L. Shaver; Stephen M. Nipper

(57) ABSTRACT

A positioned sensing device measures and/or calculates the lateral position and movement of a saw blade. These measured and calculated values are used to automatically alter the work-feed rate and/or saw blade rim speed either up or down as sawing conditions change within the work piece or between different work pieces.

1 Claim, 7 Drawing Sheets

APPARATUS FOR VARIABLY CONTROLLING WORK FEED RATE FOR CUTTING WOOD, METAL AND OTHER MATERIALS

REFERENCE TO RELATED APPLICATION

This application is a divisional of application Ser. No. 08/966,456, filed Nov. 7, 1997, Method for Variably Controlling Work Feed Rate for Cutting Wood, Metal and other Materials. This application is filed pursuant to 35 USC §120 and 37 C.F.R. 1.53(b).

DESCRIPTION

BACKGROUND OF THE INVENTION

1. Technical Field

This invention relates to circular saw and bandsaw machines, and incorporates a method of variably controlling the rate at which work is fed into the saw blade based upon performance of the saw blade within predetermined levels of stability.

2. Background

Circular saw and bandsaw machines have long been used as economical means for cutting wood, metal and other materials. In recognition of the high costs for raw material and labor, automatic/computer control of work feed rates and sawing accuracy becomes of paramount importance. Optimized automatic control of work feed rates and saw blade stability keeps material and production costs down. The use of thinner saw blades and smaller rough sawn dimension sizes can conserve natural resources in the wood products industry, and reduce material waste in all industries which use circular saw and bandsaw machines in the manufacturing process. In the lumber industry, current production methods result in a larger than necessary amount of waste in order to manufacture finished dimension lumber. Reduction of this waste requires the solution of several technical problems.

The first problem is the rate at which the work is fed into the saw blade. The work is either manually or automatically fed into these sawing machines. In manually fed machines, the operator listens to the sound of the saw blade and varies the feed rate by judgment, frequently not realizing that the saw blade is being overfed. Sawing machines having automatic feed systems, use predetermined feed rates as a function of thickness of work (depth of cut). These predetermined feed rates do not consider any variable except depth of cut. This automatic feed system permits overfeeding and in some cases underfeeding of the saw machine, resulting in erratic lateral movement of the saw blade and loss of control of the saw line. Slower than optimum feed rates are required to compensate for the variable densities of wood encountered from summer to winter, density changes within the same log, partially frozen logs, and the sharpness of the saw blade cutting teeth. The variables all require on-line adjustments to work feed rates.

The second problem is the target size of the rough sawn work, which must be maintained large enough so that finished lumber is not undersized. This excess material, which is later removed to produce finish dimension lumber, represents waste. Uncontrolled lateral deviations in the saw lines during the cutting operation require larger rough sawn target sizes. These saw blade movements have several causes: mis-alignment of saw blade guides, normal saw blade tooth wear, bending or uneven dulling of saw teeth, and knots in the saw log. These typical conditions can cause lateral instability of the saw blade, with resultant deviations of the saw line.

The third problem is offsetting of the saw blade from the desired saw line. If the saw teeth are dulled by sand, gravel or other foreign objects embedded within the material being cut, offsetting the saw line from minor deviation of 0.005 to a major of 0.080 of an inch. When a saw blade runs in an offset condition and encounters a knot, or is substantially over-fed, it is possible for the saw blade to run completely out of the work. This ruins the saw blade tension, requiring hours of bench work to bring the saw back into proper tension so that it will again cut straight and accurately. If there are large embedded rocks, or the tree had been spiked by an environmental terrorist, the saw blade could also disintegrate, destroying itself and surrounding equipment, thus requiring down time to repair the damage. The safety of personnel is also placed in jeopardy if the saw blade disintegrates.

The fourth problem is the width of the saw cut, or kerf. Reduction of the saw blade gauge/thickness, and of side clearance, (the distance the tooth extends beyond the side of the saw blade body), decreases the width of the kerf. Heavier gauges and larger side clearance are currently used to protect the saw from the instability effects of excessive feed rates.

The fifth problem encompasses other considerations that directly affect optimized cutting efficiency, such as saw blade design, saw blade strain, and guide pressure.

At the present time, these considerations are being addressed by using larger rough sawn lumber target sizes, thicker saw blades, and larger kerf dimensions. Numerous attempts through the years have been made to solve these problems, with varied success.

1. Saw blade strain devices such as weight and lever or high strain pneumatic systems have improved saw blade performance. Some improvement in saw blade stability has been obtained, and higher feed rates achieved.
2. The use of pressure guides provides an additional increment of saw blade stability. These devices are commonly used in the wood products industry.
3. A control system utilizing the saw blade sagging angle in the direction of the work feed was the basis for U.S. Pat. No. 4,437,367, which was issued to Karl Hauser. This system works well in small bandsaw machines, but will not function adequately with the larger band-mill machines which have wider saw blades. This patent applies to bandsaw machines that hinge and move to the work in lieu of the work feed system common in larger sawing machines in which the work is fed into the machine.
4. Utilizing the pressure imposed by the work on the back of the saw blade to control work feed rates, as in U.S. Pat. No. 3,680,417 issued to John R. Wells, has merit when using small band mill machines which use throw-away saw blades. Large band saw machines have blade widths exceeding two inches, and the same problems exist with this patent as with the saw blade sagging angle control system.
5. Utilizing a control system as shown in my U.S. Pat. No. 4,644,832, which uses a mean or averaged signal proportional to the lateral position of the saw blade for slowing down the depth of cut entry speed. This patent allows for the work entry feed speeds to be set higher than normal and the control logic to use "slow down steps" to reduce work feed speed in the event of unacceptable lateral movement of the saw blade. However, using this system, once a slow-down step has been made, the speed remains slowed down for the entire length of a log or cant being sawn, which lowers production output. This prior art does not address variable conditions within the same work piece, such as a log wherein the sawing conditions may vary significantly from one end to another, for example, from the butt end to the top end, as they relate to material density, sap rings, moisture content and even temperature.

In addition, my prior U.S. Pat. No. 4,644,832, does not take into consideration changes in zero reference signals which can change, in a 2-hour period, as much as 0.020 inches as a result of wear during cutting.

Finally, this prior art patent utilizes only processed signals, and in the event of significant lateral deviation of the saw blade, the prior art system does not react quick enough to prevent damage to the saw blade and/or the work piece because of the processing time required to condition the signals.

Accordingly, it is an object of this invention to provide a saw control system which is responsive to changing cutting condition so as to optimize saw cutting conditions.

DISCLOSURE OF INVENTION

These objects are achieved in a control system which continuously monitors the lateral displacement of the sawing blade from its designed straight line position by means of a sensor which is installed at a fixed known position relative to the blade. The signal is processed into an averaged signal proportional relative to a zero reference point, and thus proportional to the lateral motion of the blade for any given period of time. This signal is then compared to a plurality of reference signals to monitor the lateral position of the blade, and for purposes of adjusting the feed rate at which the material being cut is presented to the saw, or the saw is presented to the work material, as the case may be. The reference signals are provided in pairs, with the first being those proportional to a predetermined acceptable lateral motion range, followed by a second and third range reference signals. Since every sawing application is different, the set points for the reference levels are empirically determined for the particular application.

In the alternative, the set points can be determined by using mathematical formulas or fuzzy logic wherein the set points are determined in relationship to the number of times each set point is violated, so that a percentage or mathematical formula sets the violation level so that the number of violations matches the formula.

The work feed motor has a variable feed rate capability. An empirically determined table assigns to each depth of cut a thickness designation and an initial entry feed rate assignment. These entry feed rate assignments are either determined empirically or derived from existing tables published for most particular saw blade configurations. The greater the depth of cut, the slower the initial entry feed rate will be.

Prior to the material being cut being presented to the saw blade by the carriage or handling machine, it is first passed through a depth of cut thickness measurement device, where the thickness is measured and compared to the entry feed rate table and the appropriate initial entry feed rate is selected.

As the material engages the saw blade, the lateral position of the saw blade is continuously monitored by a sensor and compared to the acceptable lateral motion reference signals.

As long as the blade motion signal remains within the first, or acceptable lateral motion set points, to the work feed motor will be continuously increased at a rate of acceleration proportional to how close the saw blade is to it's zero reference point. Maximum acceleration of the feed rate and work feed motor will occur when the lateral position of the saw blade is close to it's zero reference point, and the rate of acceleration will decrease as the lateral displacement of the saw blade approaches it's first set points. Once the saw blade is displaced to a position between the first and second reference points, or deadband, then no further acceleration of the feed rate occurs. If the lateral position of the saw blade moves beyond the second reference range, the controller will signal the work feed motor to begin to slowly drop its operating speed. If the lateral position of the saw blade moves further outside of the second reference range the rate at which the work feed motor is being slowed will increase.

If the raw wave signal from the sensor indicates that the saw blade has moved laterally past a third reference point, then the controller will signal the work feed motor to immediately drop in feed rate to a much slower speed relative to the depth of cut being sawn.

In a like manner, the controller can be used to speed up or down the blade drive motor and thus provide adjustments for tip speed for the blade.

The position of the saw blade is also monitored, using the sensor. During those periods of time when the saw blade is not cutting, these readings are used to periodically reset the initial zero reference point so as to compensate for changes in position resulting from wear on the pressure guide blocks.

BEST MODE FOR CARRYING OUT INVENTION

It is an object of the present invention to optimize production of cutting products. To do this, it is necessary to understand the saw blade cutting process and to adjust saw blade rim speed and/or feed speed to ensure that optimal straight line cuts are achieved at the fastest possible rate. Reference is made to prior art FIGS. 1 and 2. Prior art FIG. 1 discloses a section of a band saw cutting blade 30 which is formed of body 32 and teeth 34. The dynamics of band saw cutting will be described in this preferred embodiment in the context of a band saw cutting dimensional lumber from a log or cant. However, it should be understood that the dynamics of cutting with other materials are essentially the same, as are the dynamics of cutting with a radial saw, as opposed to a band saw. The processes in the control system described herein apply equally well to the cutting of other materials, including metal, polymers, rods, silicates, and virtually any material which is capable of being cut.

Figure 1:
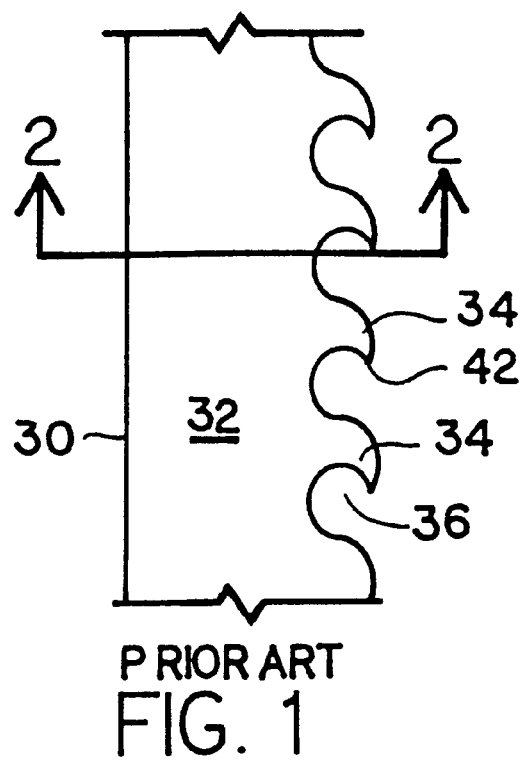
FIG. 1 is a sectional side view of a typical prior art band saw blade.
Figure 2:
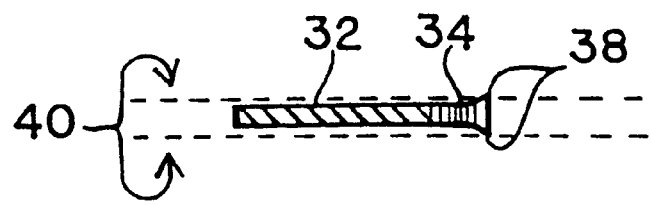
FIG. 2 is a sectional top view of the band saw blade taken along plane 2—2.

Again, referring to prior art FIGS. 1 and 2, ideally, as the material is being fed into the cutting teeth of the band saw, tips 42 of teeth 34 chip away at the material being fed into it, with the chips, which in this example are wood chips, or sawdust, collecting in the gullet 36 which is the area defined between adjacent teeth 34. For optimal cutting, the teeth 34 and gullet 36 should clear or exit the material being cut just as the gullets are nearing completely full. If the material to be cut is fed too slowly, the gullets 36 will remain partially empty, and the saw is capable of cutting or biting into the material at greater distance during its pass through the material as it is being cut. If the material to be cut is being fed in too fast, gullets 36 will fill before the adjoining teeth exit the material and, as a result, the chipped material or sawdust will be forced out of gullets 36 along side body 32 of band saw blade 30 causing frictional heat and packing the kerf 40 with sawdust.

Although there are a number of different designs for band saw and circular saw blades, the typical band saw blade used in cutting dimensional lumber has, as shown in prior art FIG. 2, has swaged teeth with swaged tips 38, thus forming a wider tip at 38 than the body 32 of the blade. The width of the cut is called the kerf, and is shown as 40 in the prior art FIG. 2. The purpose of this is to reduce spring back of cut material and to reduce abrasion of body 32 as it passes through the material being cut. If the material feed rate into the blade is too high, and gullets 36 fill, this excess material will be pushed out along side body 32 and cause rapid and unacceptable wear and heat deformation. Also, if the gullets fill too early and material is forced out from the gullets, it may be forced out along one side of the blade and not the other, thus causing the body 32 of blade 30 to become angled within the kerf 40, and thereby cause a deviation from a straight line cut.

Thus, the two primary factors which must be optimized in order to optimize the cutting process are the speed of the blade and the rate at which material is fed into it.

These factors are strongly influenced by the conditions and overall dimensions of the material being cut. For example, a typical band saw may be used to cut a typical log which is, at its base is 18" in diameter, and at its opposite end, only 12" in diameter. The same log may be much denser at its base than at its opposite end, dryer at one end or the other, or even of a different temperature from one end to the other. The greater the diameter of the log, the greater the depth of cut, and for a given fixed saw blade tip speed, the log must be fed more slowly into the blade in order to optimize cutting performance. Yet, if a constant speed is maintained over the length of the entire log, the slower speed required for optimal cutting at the 18" base may be much slower than that which would be permissible for optimal cutting at the smaller diameter, less dense opposite end.

Another set of factors which affect optimal cutting speed is the condition or characteristics of the material being cut.

With logs, it is not uncommon, at the base of the log, to have the grain of the wood and the sap rings angling out from the center line or longitudinal axis of the log. Thus, as the saw blade passes through the log parallel to the longitudinal axis of the log, it is encountering alternating rings of wood fiber and sap rings and, as a result, varying densities of material to be cut. This can result in unequal forces on the swage tips 38, which can again displace the blade from its straight-line path, and cause an angled or non-straight cut.

In a like manner, when the saw blade encounters knots in the log, the same conditions can occur which cause the blade to deviate from its straight-line path.

Ultimately it is the displacement of the blade from its straight line position which results in the non-straight cuts and, for that reason, in the present invention and as discussed in this preferred embodiment, it is the detecting of the lateral displacement of the blade from its designed straight line position which indicates that optimal cutting conditions no longer exist.

Figure 3:
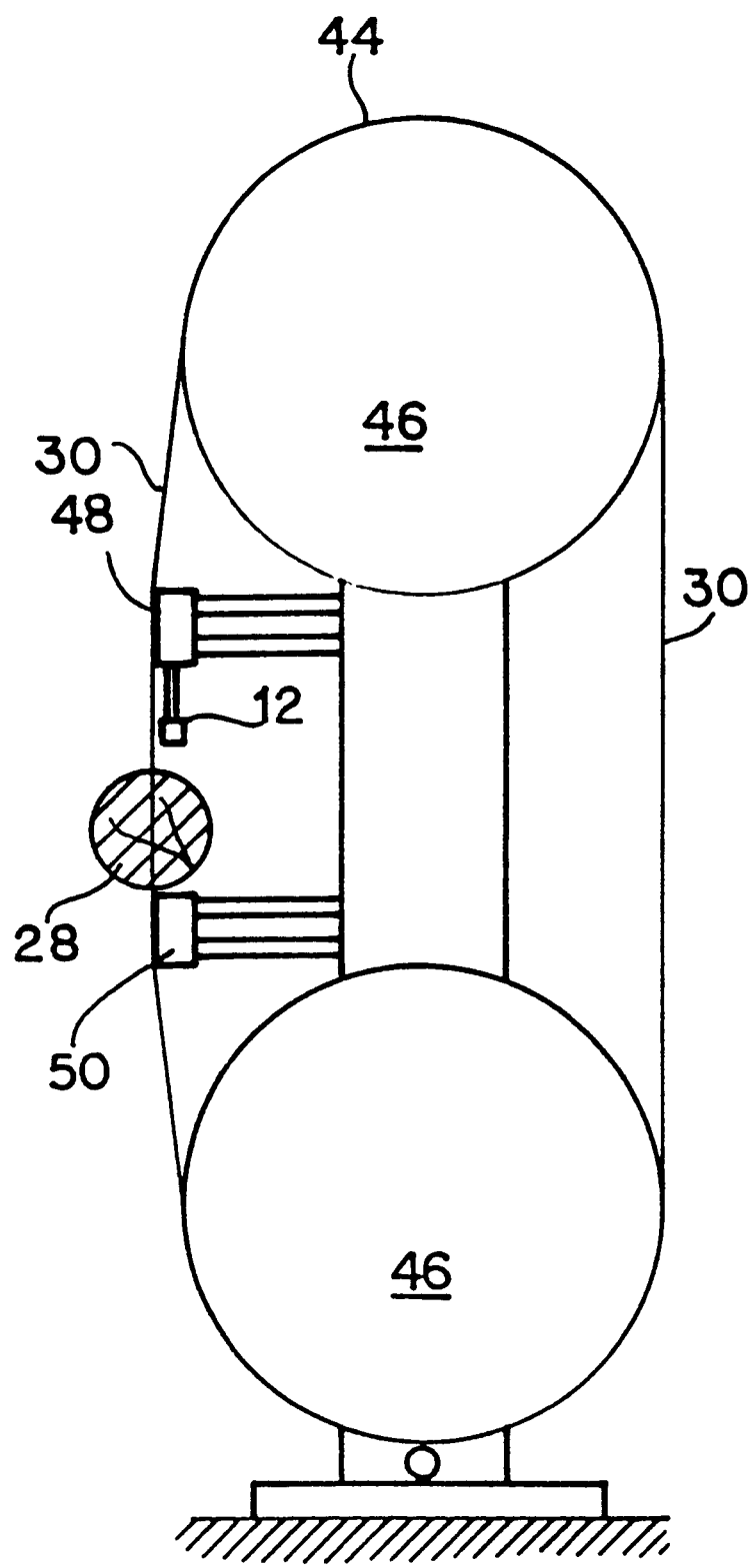
FIG. 3 is a schematic representation of a typical band saw showing the sensor position.

In the preferred embodiment, as shown in FIG. 3, saw blade 30 for band saw 44 is stretched around two opposing band saw wheels 46, and tensioned and guided, in the cutting area, by means of upper and lower guide blocks 48 and 50. A means for detecting the lateral movement of the saw blade 30 is provided in the preferred embodiment. A sensor, 12, which is, in the preferred embodiment, is an electromagnetic proximity sensor which senses eddy current, and thus the distance of a sensor to a metallic object. This is used to detect the lateral position of band saw blade 30 in the cutting area. In the preferred embodiment, sensor 12 is an electromagnetic proximity sensor developing a 50 MH RF envelope which is affected by the proximity of a moving metal blade. This proximity sensor 12 can thus generate a signal indicating the lateral position of blade 30 relative to itself. Proximity sensor 12 is installed in a fixed, known position and is attached to the sawing machine frame and/or foundation. In the preferred embodiment, sensor 12 can be attached to either of guide blocks 48 or 50, with the preferred attachment attached to the bottom of the upper guide block holder which is in a position over the top of the material being cut. An alternate position is attached to the upper side of the lower guide block 50. In some cases, when the distance between the guide blocks 48 and 50 is more than four times the width of the band saw blade, having both a top and a bottom sensing means is desirable. The sensor may also be affixed so the distance below the guide block between the work and the edge of the saw guide produces a number that represent a one to five times multiple of the sensed saw blade lateral position within the work being sawn. This ratio is the relationship between the sensing means movement and the actual movement of the saw within the work. In the preferred mounting, this requires that the top saw guide block 48 be positioned far enough above the work so that the sensor 12 obtains superior representation of saw blade lateral movement within the work. The sensor means must be mounted so it senses the movement closest to the saw teeth or just behind the gullets. In case of a double-cut machine, a sensor is used for both front and back of the saw blade.

Other means for detecting lateral movement of the saw blade presently include optical sensors, sonic sensors, laser sensors, and perhaps, even in some applications where feed rates are much slower than in logs, mechanical and strain sensors can be used.

Figure 4:
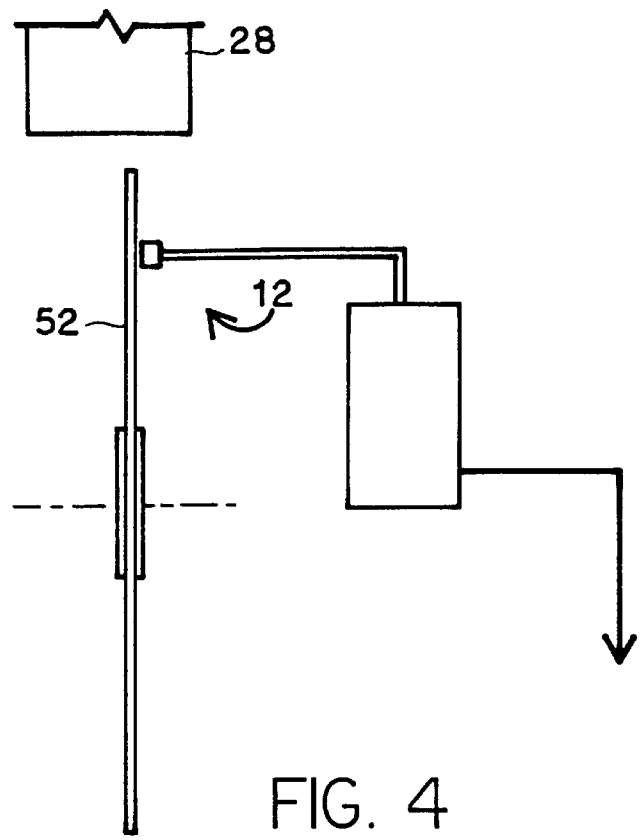
FIG. 4 is a schematic representation of a typical circular saw blade configuration showing motion sensor position.

In a circle saw machine application, such as that shown in FIG. 4, the sensor 12 is attached to the machine frame, preferably in a radial location equidistant from the entrance and exit of and adjacent to circular saw blade 52. Sensor 12 is also placed, as with the band saw machine, not more than one diameter of the sensor behind the gullets of the blade.

Figure 5:
FIG. 5 is a schematic representation of a lateral motion, raw wave signal for a band saw blade when not engaged in cutting.
Figure 6:
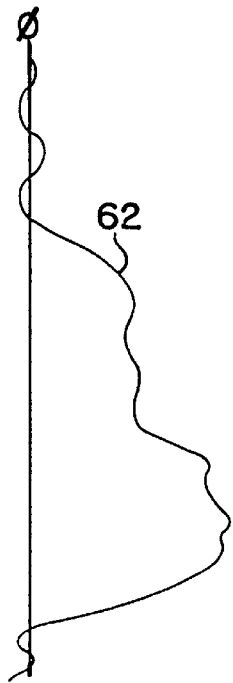
FIG. 6 is a schematic representation of a lateral motion raw wave signal for a band saw engaged in cutting.
Figure 7:
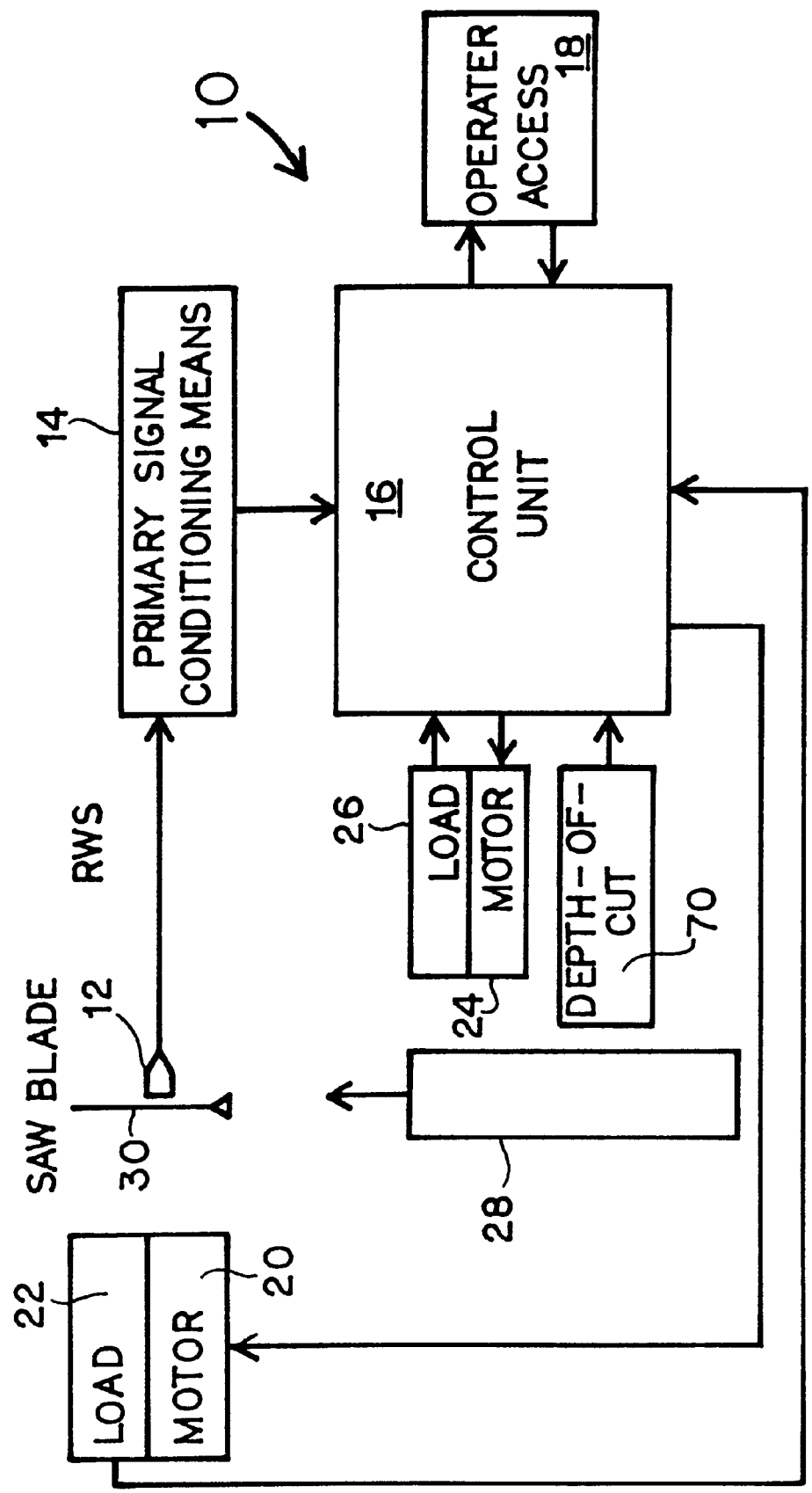
FIG. 7 is a schematic representational block diagram of the control system.

When band saw 44 is operating, and not cutting, there may typically be a small amount of lateral movement of the blade from its zero reference or stationary position. This typically will be a sinusoidal type of oscillation of minimal measurement, and is shown in representational format in FIG. 5 as sine wave 60. This type of signal from sensor 12 is averaged and used to establish the zero reference point for the lateral position of the blade. When the band saw is actually cutting material, its lateral displacement and oscillations are considerably more complex due to the various factors discussed above. The raw wave signal, from sensor 12, would correspond, during cutting conditions, to a path more or less similar to representational cutting lateral displacement path 62, as shown in FIG. 6. This raw wave signal is sent from sensor 12 to a means for generating a signal proportional to the detected lateral movement of the saw blade 30, and a zero reference point primary signal conditioning means 14 as shown in FIG. 7, in which a proportional electrical signal representing the reference position of the saw blade is generated. This primary signal conditioning means 14 can be incorporated into either sensor 12 or incorporated within the control unit 16. The configuration may change to accommodate advances in technology without changing the function or logic of the invention. This signal can now be used for direct feed rate logic control and further mathematically calculated into mean or average position and peak-to-peak vibration, and RMS values for additional control. These separate signals, reduced to engineering units of measurement, are now ready to be used in the control logic.

In the preferred embodiment, the signal conditioning means 14 is used to average the raw signal being sent by sensor 12. There are, in this preferred embodiment, two averagings occurring, the first being the average lateral displacement of the absolute peak valves in both the plus and minus directions from the zero reference point, and second, an averaging over time of the continuous signals being received from sensor 12. In the preferred embodiment, the time averaging occurs between ten milliseconds to two hundred milliseconds, depending upon the application. The purpose is to avoid having the control system react to non-harmful transients, such as for example, the blade encountering a small knot in the log.

The control unit 16 can incorporate means such as a central processing unit, computer, microprocessor or other programmable logic controller. The operator access unit 18 allows the operator to examine and change control parameters and set points. Control unit 16 also serves as a means for comparing the generating signal to a reference signal and also as a means for generating a comparative signal as is hereinafter described.

Figure 8:
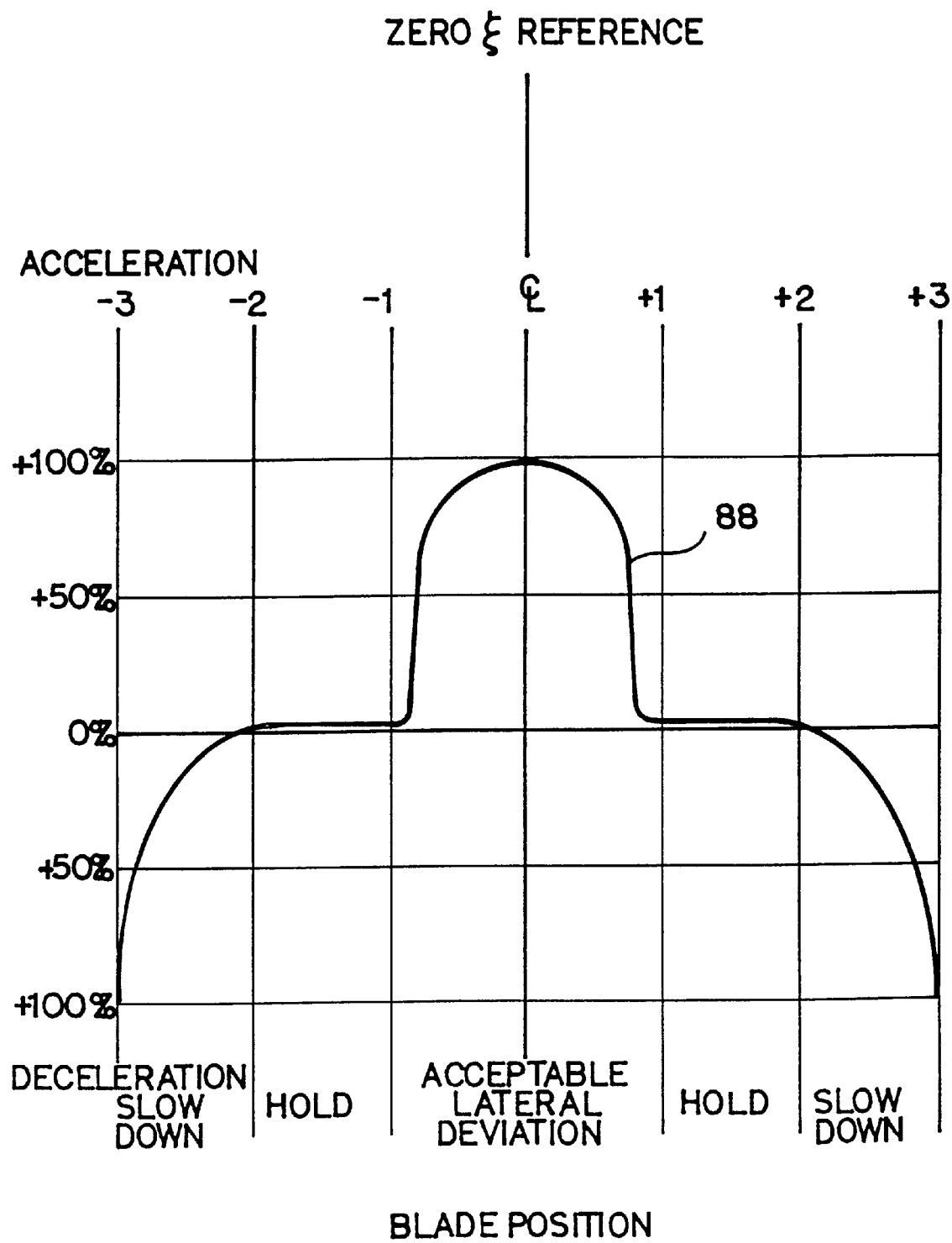
FIG. 8 is a first schematic representation of the acceptable band width, and the first, second and third reference signals and various acceleration and deceleration rates for control signal for the work feed motor.

The control unit 16 contains several pairs of control set points. As shown in FIG. 8, these set points are on either side of the zero reference or center position, having both a positive and a negative setting. The first set points, +1 and −1, are labeled the range of acceptable lateral motion and are followed by the next set points the +2 and −2 range, and then followed by the +3 and −3 set points. Additional ranges can be added as necessary. Every sawing application is different and requires set points to be set at different levels. For example, the +3 or −3 level can be ten to twenty times greater than the acceptable lateral motion level.

The work feed motor 24 has an infinitely variable feed rate over a preselected range. The feed rate is responsive and proportional to the feed rate control signal from control unit 16. In the preferred embodiment work feed motor 24 is also capable accelerating and decelerating at variable rates within a selected range which is representationally shown in FIG. 8 as +100% for the maximum rate of acceleration and −100% for the maximum rate of deceleration. Although it should be pointed out that preferred embodiment uses a variable rate of acceleration and deceleration, the invention will also work with a work feed motor 24 which accelerates and decelerates at a fixed or preselected rate.

In the preferred embodiment, control unit 16 is used to generate a comparative signal which is proportional to how close the generated signal of the detected lateral movement of the saw blade is to the zero reference point and when the generated signal of the detected lateral movement of the saw blade is between the zero reference point and one or the other of the first set points, and when the generated signal of the detected lateral movement of the saw blade is between one pair of the second and third set points, proportional to the distance the generated signal of detected lateral movement represents is to one of the third set points.

Also, as shown by line 88 in FIG. 8, the rate of acceleration or deceleration of the feed rate is dependent upon the lateral displacement or deviation of saw blade 30 from its centerline. The rate of acceleration and deceleration as shown in FIG. 8 varies proportionately to the comparative signal and relative to the amount of lateral displacement of saw blade 30 from its zero reference point or centerline. The rate of acceleration of work feed motor 24 is maximum when there is no lateral displacement, and gradually decreases to no acceleration as the lateral displacement reaches one of the first set points. Deceleration is also proportional with maximum deceleration of work feed motor 24 occurs when the lateral displacement of saw blade 30 approaches one of the third reference points and gradually reduces the rate of deceleration as lateral displacement of saw blade 30 approaches the second reference point. There are a number of different methods of generating the comparative signal and establishing this proportionality ranging from the establishment of empirical tables to the use of integral or derivative signals derived from the lateral displacement signals from sensor 12 and/or control unit 16.

In the alternative, the set points can be determined by using mathematical formulas or fuzzy logic wherein the set points are determined in relationship to the number of times each set point is violated so that a percentage or mathematical formula sets the violation level so that the number of violations matches the formula over time.

As long as saw blade 30 remains within range defined by the first set points, +1 and −1, the control signal from control unit 16 will keep increasing the feed rate of work feed motor 24. It will accelerate at or near its maximum rate as long as saw blade 30 remains at or near the centerline or zero reference point. As the lateral displacement of saw blade 30 nears one of the first set points, +1 or −1, the rate of rapid acceleration decreases and stops as the lateral displacement of saw blade 30 passes the first set point and into the range between a first and second set point. In the preferred embodiment, once the lateral displacement of saw blade 30 enters into the range between the +1 to +2, or between −1 to −2, there are no further increases in the feed rate.

In a like manner, if the lateral displacement of saw blade 30 exceeds either of the second set points, +2 or −2, the control signal from control unit 16 will first begin a gradual or slow deceleration, and will increase to the maximum possible rate of deceleration as the lateral displacement of saw blade 30 approaches either of the third set points, +3 or −3.

In the preferred embodiment, if the lateral displacement of saw blade 30 as represented by the raw wave signal exceeds a third set point, control unit 16 will stop work feed motor 24 to hopefully prevent damage to saw blade 30, and its operator, if, for example, saw blade 30 were to encounter a large rock, or even a metal spike embedded in the log when it was a standing tree by an environmental terrorist.

The cutting cycle for the work, which as the example being used in this best mode section is a log, begins with log 28 being loaded on to a feed carriage or other material handling device movable into and out of saw blade 30 by work feed motor 24. An empirically determined table assigns, to each depth of cut, a thickness designation and an initial entry feed rate assignment. These entry feed rate assignments are either determined and set empirically or derived from existing tables published for most particular saw blade configurations. The greater the depth of cut, the slower the initial entry feed rate will be. Along with the entry feed rate, the maximum feed rate and the maximum rates of acceleration and deceleration are also preselected, so that the greater the depth of cut, the lower the maximum feed rate and the rates of acceleration and deceleration, and the smaller the depth of cut, the greater the rates of feed and acceleration and deceleration.

Alternatively, and as some saw mill operators prefer to do, the entry feed rate may be manually determined by the sawyer, in which case the maximum feed rate, and rates of acceleration and deceleration, are determined by using the manually selected entry feed rate selected by the sawyer as the initial entry set point for the work feed rate control signal generated by control unit 16. It doesn't really matter which method of determining entry speed is used since the work feed rate will rapidly change dependent upon sawing conditions.

In some cases where manually determined entry feed rates are used by the sawyer, a sensor may be positioned on the control handle used by the sawyer to establish a high and low threshold set point for determining the maximum feed rate increase that will be permitted by the control system. That is to say, if the entry rate manually determined by the sawyer is below the set point, then one hundred per cent acceleration as is shown by curve 88 of FIG. 8 will be permitted. However, in the case that the sawyer sets an entry feed rate above the threshold, only fifty per cent acceleration will be permitted, as represented by curve 92 of FIG. 8. In other words, the control system is configured if the sawyer selects an entry feed rate which is higher than a predetermined set point.

In a depth of cut feed rate sawing machine application, the normal continuous sequence of events for the controller system as follows:

The work, which as previously stated in this description of the Best Mode is a log or cant 28, passes through a depth of cut thickness measurement means 70 prior to feed entry into the saw blade so that its thickness is measured and compared to a predetermined entry feed rate table and the appropriate output value is sent to the work feed motor 24 to move the log or cant into the saw blade at the appropriate predetermined speed. The depth of cut or thickness measurement means 70 is typically a set of optical sensors, or other devices, all of which are well known in the art.

As log or cant 28 engages saw blade 30, the lateral position of saw blade 30 is continuously sensed by sensor 12 and compared to the reference signals, +1 and −1, identified as the acceptable lateral motion signals in FIG. 8. These reference signals are proportional to the blade motion signal that would be generated at predetermined acceptable lateral movement of the saw blade.

The averaged blade-motion signal is then compared to the zero reference signal and the acceptable lateral motion or first reference signals. If the blade motion signal remains within the acceptable lateral motion reference signals for a period of time, for example, twenty-five milliseconds or one hundred fifty milliseconds, then the output to the work feed motor 24 will be rapidly increased. This loop continues at specified time intervals as long as the lateral position of the saw blade, as indicated by the generated blade motion signal, is in the acceptable lateral motion range. As the lateral displacement of saw blade 30 approaches either of the first reference signals, the rate of increase in speed slows down, and as the lateral displacement of saw blade 30 crosses either of the first set points, +1 or −1, acceleration stops, and the control signal from control unit 16 remains constant, thus controlling work feed motor 24 at a constant speed.

As long as the lateral position of the saw blade remains between the acceptable lateral motion set points of +1 or −1 and the +2 or −2 range, the feed rate remains at its obtained setting. However, it is not necessary to do this. And in a second embodiment of the invention, in lieu of the hold constant speed range, it is possible to immediately begin gradual deceleration to bring the lateral displacement of saw blade 30 back within the first reference signal. This configuration is not preferred since it may result in control signal hunting, and thus increases the wear on work feed motor 24, but it can be used.

If the lateral position of the saw blade, as indicated by the generated blade motion signal crosses beyond the either +2 or −2 set points, the control unit 16 will send the comparative signal to the work feed motor 24 to begin slowly dropping its operating speed. If the lateral position deviation continues to increase, the rate at which work feed motor 24 decelerates will increase. As the lateral deviation of saw blade 30 begins to return towards the second set point, rate at which the feed carriage is decelerating. This process will continue until lateral saw blade motion drops within the range between the first and second set points at which time the control signal will remain constant.

Figure 9:
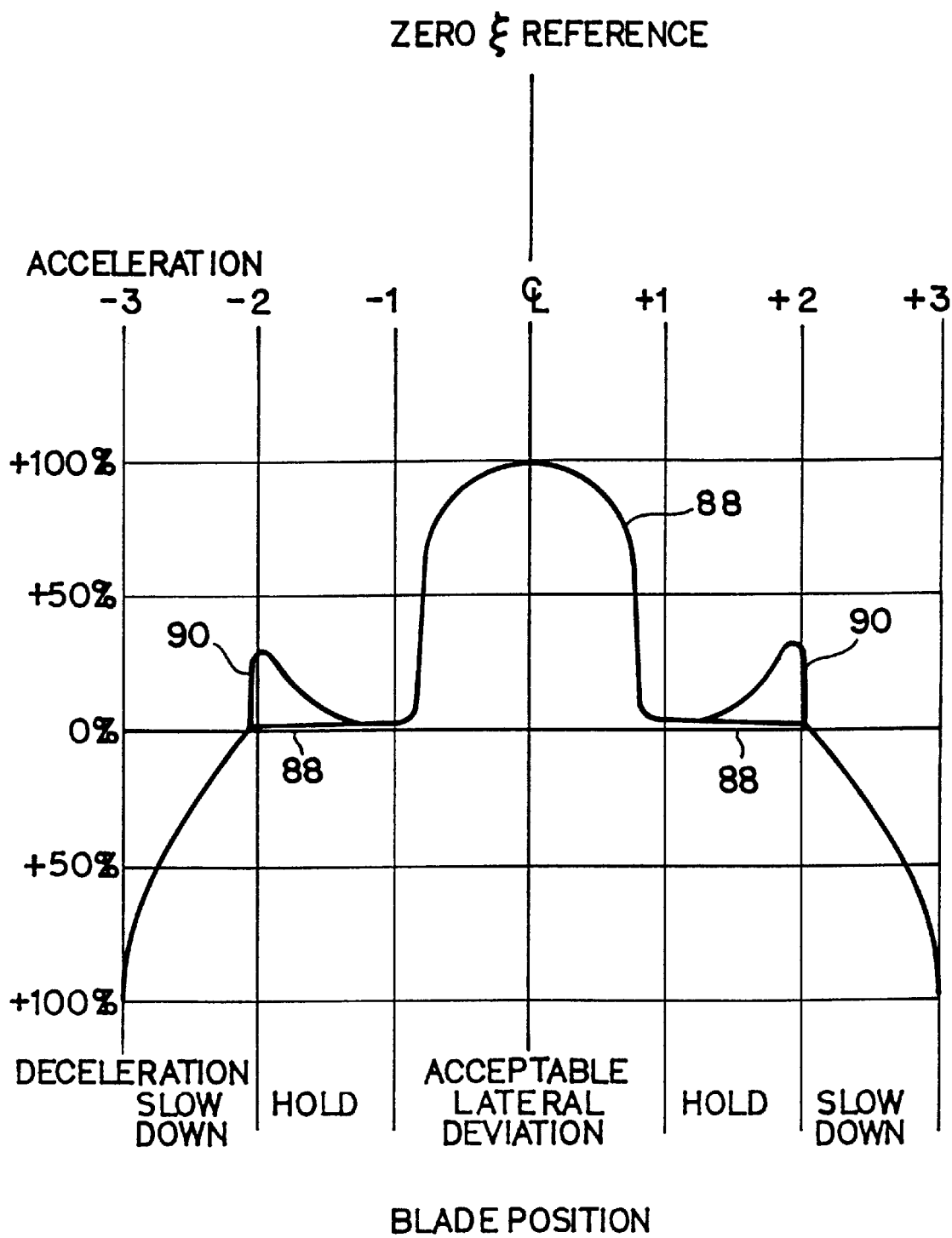
FIG. 9 is a second schematic representation of the acceptable band width, and the first, second and third reference signals and various acceleration and deceleration rates for control signal for the work feed motor.

In a third embodiment two different sets of control signal acceleration tables are used. In the case of increasing feed rate speed and increasing lateral displacement, the acceleration table, as represented by line 88, is the same as the for the first preferred embodiment. However, as is shown in FIG. 9, a different acceleration table, as shown by line 90, is used for conditions when lateral displacement is decreasing and eventually reduced to the either of the first, +2 or −2, set points. In this embodiment, instead of holding feed rate constant, as control is being restored to the lateral displacement of saw blade 30, as it returns to within the second set point, it is instead immediately increased. It has been found in practice that immediately increasing speed helps in recovery of saw blade 30 to within the acceptable lateral displacement range. The reason for this is that with saw blade 30 slowed down the gullets are being filled with extremely fine or small wood chips and dust which can spill out of the gullets and again laterally displace the blade. By immediately speeding up saw blade 30, the chips in the gullet are larger and thus do not fall out of the gullet into the kerf.

The primary signal conditioning means 14 also monitors and maintains the raw wave signal being provided from sensor 12, without averaging over time, but rather in a peak-to-peak absolute value configuration. If, in the preferred embodiment, the raw wave signal passes over the value of the third, +3 or −3, reference signals, then controller 16 will signal the work feed motor 24 an immediate stop or slow to a very low predetermined speed. In this manner, control unit 16 adjusts speed cycle up or down at varying rates of acceleration, but can also move from the maximum speed for any particular depth of cut to a stop signal in one jump if the raw wave signal exceeds the third reference value. This is done as a safety precaution, since the raw signal can be processed much quicker than the time averaged blade motion signal.

In this manner, the control system operates within the established set points to cycle the feed speed up or down according to the lateral position of the saw blade In a like manner, control unit 16 can be used to control the speed, up or down, of saw blade drive motor 20 and thus provide adjustment for the tip speed for blade 30.

Another control consideration, depending upon the application, is the optional monitoring of both the work feed motor load monitor 26 and saw blade motor load monitor 22 to monitor load amps or horsepower usage. Set points for maximum amps can then be used to either inhibit feed rate increases or drop the feed, and in a like manner inhibit or increase blade speed. If a chipper or slabber is utilized in series with the saw blade assembly, a load measurement means can also be provided to control the speed and feed rate of these machines in the same manner as the saw blade and feed rate motors.

Figure 10:
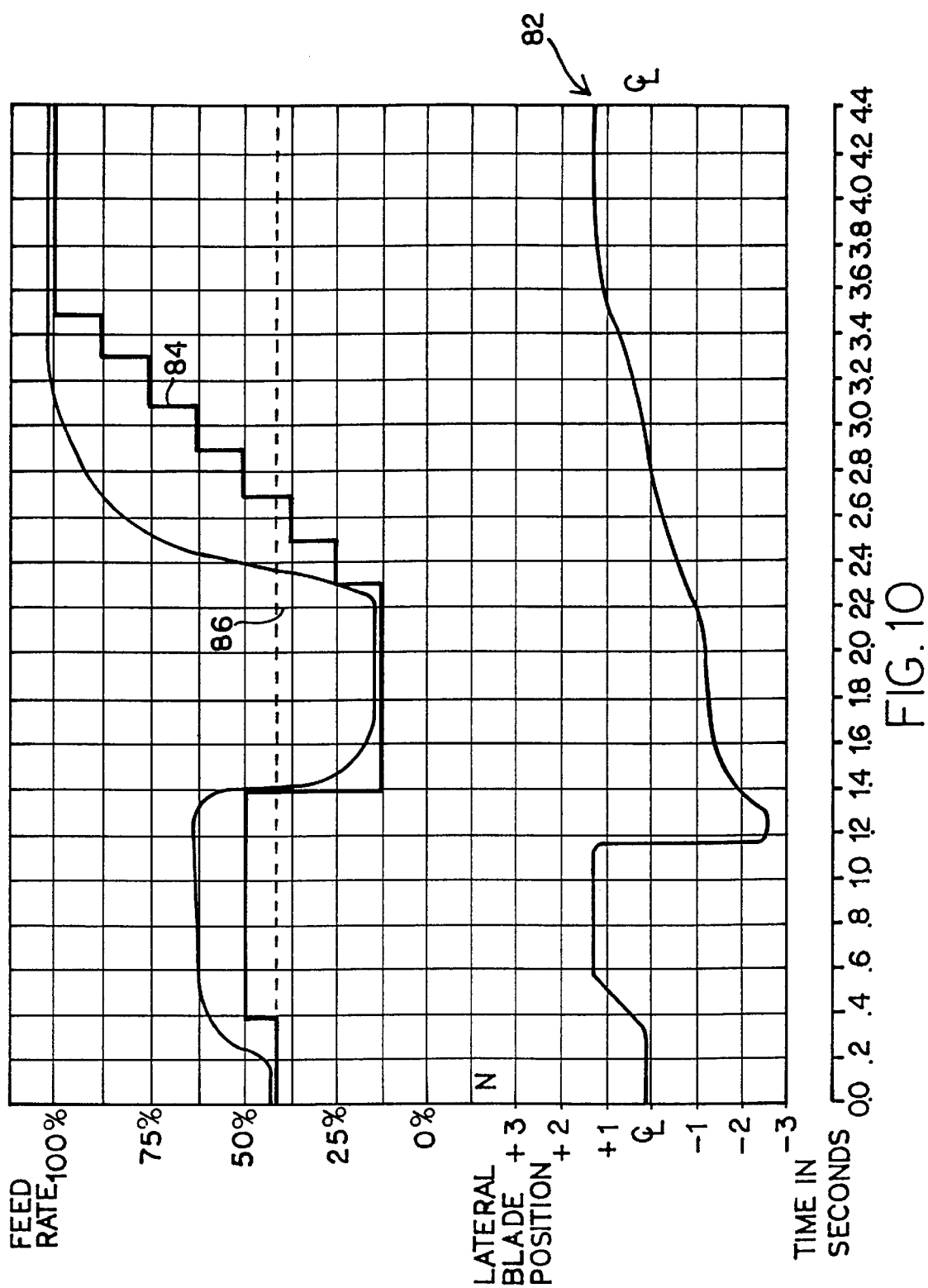
FIG. 10 is a graphical representation of the interrelationship between lateral displacement of the saw blade and variable work feed rate.

FIG. 10 is a representational graph which compares lateral displacement of saw blade 30 as shown in line 82 to time, given in tenths of seconds, and to feed rate, given as a percentage of maximum feed rate for any given depth of cut, using a stepping signal to motor 24 for work feed speed, on line 84, and the work feed signal to motor 24 of the present invention as shown by line 86. FIG. 10 is not necessarily drawn to scale, but rather is meant to illustrate the advantages of the present invention. The line 84 showing the feed rate for stepping feed signal to motor is representative of the feed rate control system of my U.S. patent application Ser. No. 08/569,518 filed Dec. 8, 1995 and entitled METHOD FOR CONTROLLING WORK FEED RATE FOR CUTTING WOOD, METAL AND OTHER MATERIALS. At time 0.0, the log 28, used as an example in this description of the first preferred embodiment, initially enters the saw blade 30, which upon entry is its zero reference set point or central line. With the stepping motor the control system senses that lateral blade displacement is within the acceptable range, and at time 0.4 seconds the control system increases the feed rate one step, which causes lateral displacement of saw blade 30 to increase to between the first and second reference points, as shown in line 84. At time 1.2 seconds, saw blade 30 encounters a hypothetical knot in log 28 and is laterally displaced from the +1 to +2 range to between the −2 and −3 range of lateral blade displacement, thus causing the feed rate for the stepping motor to drop an immediate three steps, which restores lateral displacement to the range of between −1 and −2, thus causing the feed rate to remain at a constant slower speed. As saw blade 30 continues to recover from its laterally displaced position, beginning at 2.2 seconds, the stepping motor of line 84 is gradually stepped up in speed back to its original entry speed and eventually four steps beyond it to obtain a maximum feed rate at 3.6 seconds.

However, the control system of the present invention reacts more quickly, as is shown by line 86. At 0.2 seconds, upon entry of the log 28 into saw blade 30, since there is no lateral saw deviation, an immediate, rapid acceleration occurs until at 0.4 seconds the lateral displacement of saw blade 30 is in the +0.1 to +0.2 range and remains there until 1.1 seconds when it encounters the hypothetical knot. At this time, the lateral displacement for saw blade 30 is in the −2 to −3 range, and as a result, the feed rate is rapidly decreased, and as can be seen, as the lateral displacement begins to recover to the −1 to −2 range, the rate of deceleration is slowed and the work feed rate levels out at approximately the same level as it would with the stepping signal, as shown in lines 86 and 84.

The advantage of the present invention is that when the lateral displacement of saw blade 30 recovers into the acceptable range, the work feed rate is rapidly and smoothly accelerated, and continues its rapid acceleration until the lateral displacement approaches the +1 set point, at which time the acceleration slows, and the feed rate gradually approaches a constant speed when lateral displacement of saw blade 30 exceeds the +1 reference set point at 3.6 seconds, as shown on line 86. The net effect of the variable acceleration and control of the present invention has a quicker reaction time to improving sawing conditions, and thus operates at higher speeds more of the time than would otherwise occur if a stepping motor or other control system were used. In practice, 5% increases in production capacity for any given mill may be realized by use of this new system.

Another feature of the present invention, found in all three of the preferred embodiments, is the fact that the proximity sensor control system can be used to control the return rate of the carriage once a cut has been completed on the log or its derivative cant. On the return of the carriage, the rotating saw blade 30 travels back down along side the kerf surface as that portion of the cant remaining on the carriage is withdrawn from the saw. During the return portion of the cycle, the blade hopefully travels along side the remaining side of the kerf and does not encounter the sides of the cut work. High speed return of the carriage saves significant time of operation since the log or cant may be sawn several times before it is unloaded off the carriage. However, a high speed return is restricted without automatic speed control by the possibility of a saw being snagged or hooked by a sliver from the log or cant and thus the possibility of pushing the saw blade off the wheel, which not only wrecks the saw blade, but is a dangerous situation for saw mill personnel. As a result, continued monitoring of lateral displacement of saw blade 30 during the return of the carriage provides override control of the manual feed control for these emergencies, and is critical for safety. The ability to control carriage speed during the return phase of operation is a part of this control system. In the case of a double cutting sawing machine, that is to say in a saw where sawing also occurs as the feed carriage is returned, sawing is controlled in both cutting directions as previously described.

As normal wear occurs on upper and lower guide blocks 48 and 50, the distance between sensor 12 and band saw blade 30 can change. This wear can easily amount to as much as ten thousandths of an inch per hour. This type of wear can alter the position of the zero reference set point, and, in many applications, can drastically affect the effectiveness of the calibrations of the first, second and third reference points. To automatically compensate for this wear, the zero reference point is periodically recalibrated, and thus the values of the acceptable lateral motion, first, second and third reference points are updated. This is accomplished by monitoring the position of the saw blade, using sensor 12, during those time periods when material is not being fed into the saw and the saw is not cutting. At the beginning of the work cycle, this first detection of location of the saw blade, when not engaged in sawing material, is used to establish the initial zero reference point. Thereafter, in the preferred embodiment, each time the saw is not working or engaged in sawing material, its location is monitored by sensor 12 and saved in controller 16. Averages of the stored readings are then taken, in the preferred embodiment, every five minutes. This average is then compared with the readings of the then current zero reference value, and if different, the zero reference value is reset as needed.

While there is shown and described the present preferred embodiment of the invention, it is to be distinctly understood that this invention is not limited thereto but may be variously embodied to practice within the scope of the following claims.

I claim:

1. An apparatus for variably controlling the feed rate of material to be cut by a saw having a saw blade and a wearable guide block, said apparatus comprising:

a sensor means;

said sensor means for establishing a zero reference point for the lateral position of the saw blade;

said sensor means for detecting lateral movement of the saw blade away from the zero reference point when the saw blade is cutting material being fed into the saw blade and when said material is being withdrawn from the saw blade;

means for generating a signal proportional to the detected lateral movement of the saw blade;

a primary signal conditioning means for establishing a reference signal proportional to the proportional signal generated at a preselected acceptable lateral movement of the saw blade;

a control unit means for controlling feed rate of the material;

said control unit means for comparing the generated signal to the reference signal, wherein if the generated signal is less than the reference signal, then the means for controlling the feed rate of the material continuously increases the feed rate, wherein if the generated signal is greater than the reference signal, then the means for controlling the feed rate of material continuously decreases the feed rate, wherein said control unit means compares the generated signal when the cut material is being withdrawn from the saw blade to the reference signal, wherein if the generated signal is less than the reference signal, then said control unit means increases the withdrawal rate, and wherein if the generated signal is greater than the reference signal, then said control unit means decreases the withdrawal rate; and wherein said control unit means and said sensor means automatically and periodically reestablishes said zero reference point to compensate for guide block wear and build up by said sensor means detecting the location of the saw blade when it is not engaged in sawing material to establish an initial zero reference point, said sensor means generating an initial lateral position signal indicating the lateral position of the saw blade to the sensor means, said sensor means again detecting an updated location of the saw blade when it is not engaged in sawing material, said sensor means generating an updated lateral detected lateral movement signal proportional to the position of the saw blade when not engaged in work, and said control unit means and said sensor means resetting said zero reference point to conform to the updated lateral position signal.

* * * * *